July 29, 1969     W. R. WHEELER     3,458,221
METAL VACUUM JOINT
Original Filed Feb. 6, 1963
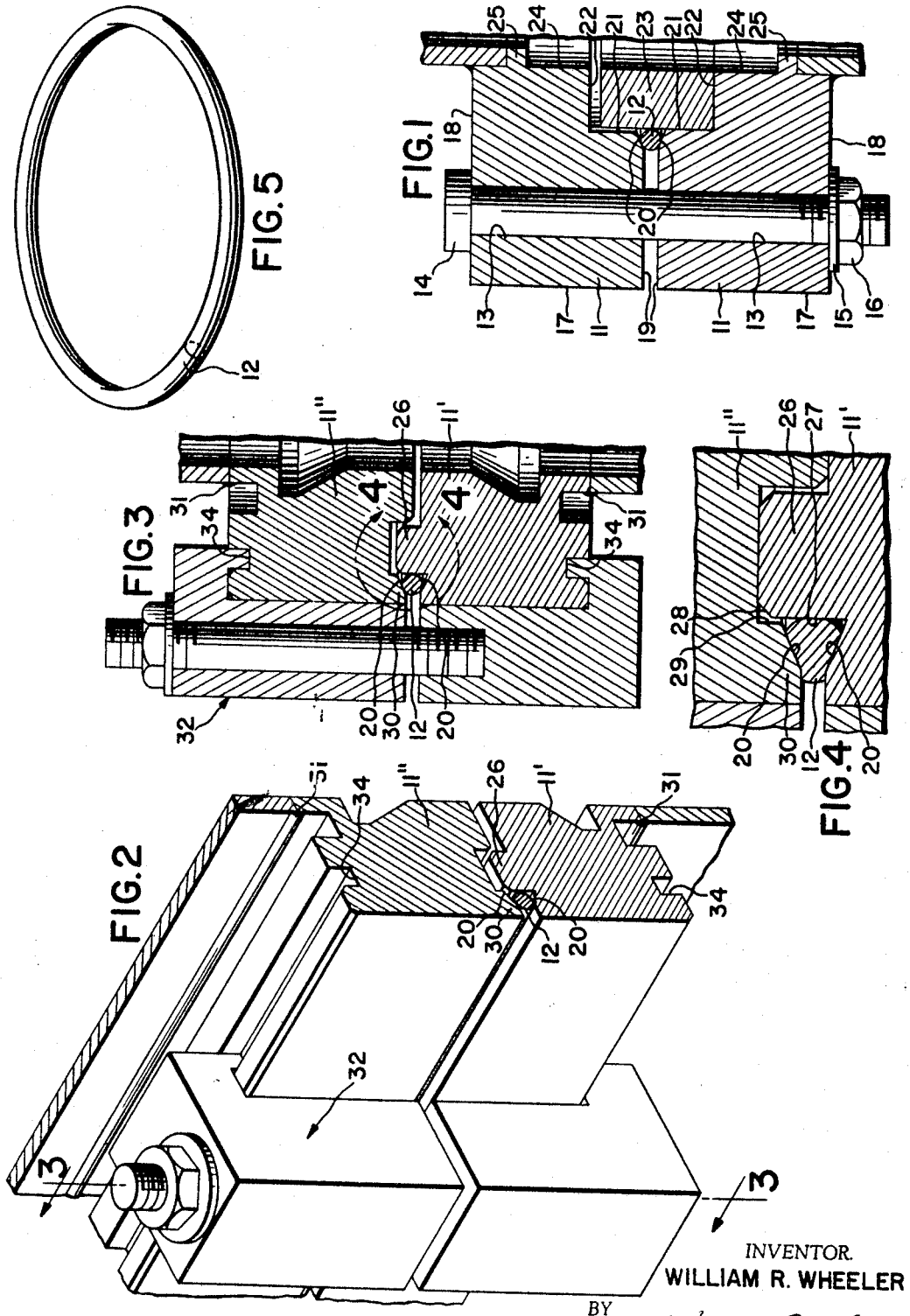
INVENTOR.
WILLIAM R. WHEELER
BY
*Harry E. Aine*
ATTORNEY

United States Patent Office 3,458,221
Patented July 29, 1969

3,458,221
METAL VACUUM JOINT
William R. Wheeler, Saratoga, Calif., assignor to Varian Associates, Palo Alto, Calif., a corporation of California
Continuation of application Ser. No. 256,744, Feb. 6, 1963. This application Oct. 22, 1965, Ser. No. 500,792
Int. Cl. F16l *19/02, 23/00*
U.S. Cl. 285—331         2 Claims This is a continuation application of my copending application Ser. No. 256,744 filed Feb. 6, 1963, and now abandoned.

This invention relates to vacuum joints, and more particularly to bakeable, all metal vacuum joints.

In many vacuum applications it is necessary to bake the vacuum system components to high temperatures in order to reach ultra-high vacuum. This requirement makes it undesirable to use conventional non-metal seals (for example, those using rubber gaskets, grease, etc.) because at high temperatures they evolve large quantities of gas which can contaminate the vacuum system or are destroyed. Therefore, completely metal vacuum joints (for example, copper O-ring seals, step, and knife edge seals with copper gaskets, and a new extremely reliable high vacuum seal which is the subject of a copending application, Ser. No. 144,458, filed Oct. 11, 1961, and now Patent No. 3,208,758 and assigned to the same assignee as the present invention) have come into use for many high vacuum applications.

All the above employ a type of soft metal gasket, for example, copper. For some of the above seals the gaskets are of rectangular cross section which are usually cut or stamped out from a sheet of the metal being used. Others are formed into tubes of circular cross section. In either case, the cost of the gaskets can be considerably high when the amount of wasted material and time for fabrication is taken into consideration, particularly in the case of seals of very large diameter.

It is the principal object of this invention, therefore, to provide an extremely reliable high vacuum joint which is highly bakeable, convenient to use, and economical and practical to manufacture.

One feature of the present invention is the provision of a sealing flange having a face with a beveled portion forming a slanted side and adapted to make an acute angle with the direction of relative movement between the flange member and a soft metal gasket.

Another feature of the present invention is the provision of a sealing flange of the above type wherein the acute angle which the slanted side makes with the direction of relative movement is between 55° and 75° inclusive.

Still another feature of the present invention is the provision of a metal vacuum joint utilizing a pair of sealing flanges of the above type.

A further feature of the present invention is the provision in a metal vacuum joint of the above type of a back-up ring adapted to provide, with the slanted sides of the sealing flanges, a compartment for trapping the soft metal gasket upon compression of the gasket by the flanges' slanted sides.

Another feature of the present invention is the provision of a metal vacuum joint utilizing sealing flanges of the above type in which the first of said sealing flanges has a shoulder portion having a side wall opposite the slanted side.

Still another feature of the present invention is the provision of a metal vacuum joint of the above type wherein the slanted side of the sealing flanges and the side wall of the shoulder portion of the first sealing flange are adapted to provide a compartment for trapping the soft metal gasket upon compression of the gasket by the flanges' ridge portions.

A further feature of the present invention is the provision of a metal vacuum joint of the above type wherein the second of said sealing flanges has a shoulder portion with an inner wall which upon compression of the soft metal gasket by the slanted sides abuts a portion of the inner wall of the shoulder portion of the first sealing flange.

Another feature of the present invention is the provision in a metal vacuum joint of any of the above types of a soft metal gasket comprising a wire, preferably copper.

Still another feature of the present invention is the provision of a soft metal gasket of the above type in which the copper wire is joined at its ends by cold-welding.

These and other objects and features of the present invention and a further understanding may be had by referring to the following description and claims, taken in conjunction with the following drawings in which:

FIG. 1 is a fragmentary cross sectional view of a high vacuum joint device of the present invention;

FIG. 2 is a fragmentary perspective view of another high vacuum joint device of the present invention;

FIG. 3 is a cross sectional view taken along the lines 3—3 of FIG. 2 in the direction of the arrows;

FIG. 4 is an enlarged cross sectional view of the area delineated by 4—4 of FIG. 3, but with the high vacuum joint device tightened; and FIG. 5 is a perspective view of the sealing gasket of the present invention.

Referring now to FIG. 1, there is shown one embodiment of the metal vacuum joint of the present invention. Positioned between a pair of annular flange members 11 made of, for example, stainless steel is an annular sealing gasket 12 made of a soft metal, for example, copper. The gasket 12 may be nothing more than a length of copper wire bent into the shape of a circular loop and joined at its ends in a particular fashion to be described hereafter. The flange members 11 are provided with a plurality of circumferentially arranged holes 13 which accommodate a plurality of bolts 14 made of, for example, stainless steel. Each of the bolts 14 has a washer 15, and a nut 16 for providing a force to cause relative movement between the annular flange members 11 and the gasket 12.

The annular flange members 11 have a generally rectangular cross section with one smooth outer edge 17 and one flat side 18. The second side or face 19 of flange members 11 are also generally flat except for a beveled portion which forms a slanted side 20 at an acute angle with the direction of relative movement. The slanted side 20 terminates on a riser portion 21 which together with step portion 22 forms a recess for a separate backup ring 23, made of, for example, stainless steel. The inner edges 24 are generally smooth except for a ridge portion 25 of rectangular cross section.

In the operation of the embodiment of FIG. 1 the inner edges 24 and ridge portions 25 are secured by, for example, welding to a pair of hollow vacuum system components (not shown) which it is desired to join in vacuum tight communication. Back-up ring 23 is positioned within the annular cavity formed when the recesses formed by riser 21 and step 22 portions are brought into alignment. The gasket 12 is positioned over back-up ring 23 and onto the slanted side 20 of flange member 11 making a tight fit against the back-up ring 23. Nuts 16 are then tightened on bolts 14 which results in a relative movement between flange members 11 and gasket 12 in a direction perpendicular to the flat portions of faces 19.

The relative movement between the flange members 11 and gasket 12 causes compression of the gasket 12 by the slanted sides 20. A normal force proportional to the total force applied by the bolts 14 then exists between the gasket 12 and the slanted sides 20. The normal force has a component which is parallel to the direction of relative movement and a component which is perpendicular to this direction of relative movement. However, the soft metal gasket material is restricted from moving in the direction of relative movement by the slanted side 20 of the opposing flange member 11, and is restricted from moving in the direction perpendicular to the direction of relative movement by the back-up ring 23.

Thus, the slanted sides 20 and back-up ring 23 form a compartment which traps the soft gasket material. The trapping of the basket material results in the attainment and maintenance of extremely high pressure at the interface between the gasket 12 and slanted sides 20, thereby forming a truly intimate fit. It is believed that the gasket material, when stressed beyond its elastic limit, can be regarded as a highly viscous fluid. A period of time is therefore required for the gasket material to flow into the scratches and irregularities. Seal geometries which do not effectively capture the gasket material adjacent to the seal area allow the body of the gasket to distort thereby relieving the pressure at the interface before a truly intimate fit has been achieved. Also, this arrangement lends itself quite easily to the use of soft metal copper wire gaskets, which will result in a substantial saving in time for fabrication and materials, particularly where the seal diameter might be several feet.

The preferable size of the angle which the slanted side 20 makes with the direction of relative movement has been found to be in the range between 55° and 75° inclusive. It appears that the amount of pressure which can be maintained between the gasket 12 and the slanted side 20 for a given applied force is dependent on the angle. It is believed that this unit pressure is in a maximum range for angles between 55° and 75° with an apparent absolute maximum around 70°.

There are other advantages for utilizing an angle between 55° and 75°. For example, as the angle becomes exceedingly large, the trapping ability of the slanted side is lessened with the gasket material having a greater freedom of movement in a direction away from the back-up ring 23.

The embodiment of FIG. 1 also has the added advantage that the flange members are asexual.

As shown in FIGS. 2, 3, and 4 the separate means restricting movement in a direction perpendicular to the direction of relative movement between flange members 11 and gasket 12 can be made integral with one of the flange members. This is accomplished as follows. The slanted side 20 of bottom flange member 11' terminates at a shoulder portion 26 having a side wall 27 beveled slightly at 28. The slanted side 20 of the upper flange member 11" terminates at the side wall 29 of the shoulder portion 30.

In the operation of the embodiment of FIGS. 2, 3 and 4, the flange members 11' and 11" are secured by, for example, welding at 31 to a pair of hollow vacuum system components (not shown) which it is desired to join in vacuum tight communication. The gasket 12 is slipped over the beveled portion 28 and onto the slanted side 20 of flange member 11', making it a tight fit against the side wall 27. Although the flange members can be provided with a plurality of circumferentially arranged bolt holes to accommodate the conventional nut and bolt assembly as in FIG. 1, the embodiment shown in FIGS. 2, 3, and 4 employs a series of clamps 32 arranged about the circumference of the flange members, and having ridge portions arranged to fit in annular grooves 34 in flange members 11' and 11". This has the following advantages. Much less flange material is needed, hence a somewhat lighter flange is achieved. Secondly, by using this arrangement the force is applied to the flange more directly over the gasket wire. Hence, less bending moment is exerted on the flange and less danger of distortion exists.

When the clamps 32 are tightened (see FIG. 4), the soft metal gasket 12 is compressed by slanted side 20 of flange member 11". The soft metal gasket material is restricted from moving in the direction of relative movement by the slanted side 20 of flange member 11', and from moving in the direction perpendicular to the direction of relative movement by side wall 27. Thus the trapping compartment is formed by slanted sides 20 and side wall 27.

While flat soft metal gaskets, or metal O-rings could be used in the embodiments of FIG. 1 and FIGS. 2–4, a further advantage of this invention is that a wire, preferably copper, may be used as the sealing gasket 12, at a considerable saving in labor and material (see FIG. 5). Such metal wire gaskets have been used in the past, but usually at the expense of the sealing properties of the metal vacuum joint. For a gasket to be effective in an all metal vacuum joint and have superior resistance to thermal effects, its hardness level must be relatively high throughout its entire length. It has been discovered, however, that when wire gaskets are butt joined by brazing, resistance welding, or arc welding, the area around the joint is unavoidably annealed, resulting in low quality seals. The sealing gasket 12 of FIG. 5 was formed simply by bending a length of wire, preferably copper, into a loop and joining it at its ends by cold-welding in the well known manner. The joint area, if anything, was found to be harder than the rest of the wire, and when used in metal vacuum joints of the above type, optimum seal quality was attained.

What is claimed is:

1. A high vacuum joint device to be used between a high and low pressure region comprising: a first flange member and a second flange member adapted for relative movement towards each other; each of said flange member having a face with a beveled portion forming a slanted side at an acute angle between 55–75° with the direction of relative movement; said slanted sides on said flange members being directly opposite each other; said first flange member having a shoulder portion with a wall opposite said beveled portions forming a cavity with said slanted sides substantially parallel to the direction of relative movement; a soft metal sealing gasket positioned between said slanted sides of said flange members; the dimension of said cavity taken in the direction of relative movement being less than the initial dimension of said gasket taken in the direction of relative movement; and means for drawing said flange members together in the direction of relative movement to stress said gasket beyond its elastic limit, causing the soft metal to flow towards said shoulder portion where it is restricted by said wall, thereby creating a seal of great pressure along the interface between said gasket material and said beveled portions.

2. The device according to claim 1 wherein said second flange member defines a recess for receiving said shoulder of said first flange member when said flange members are drawn together to stress said gasket.

References Cited

UNITED STATES PATENTS

| | | | |
|---|---|---|---|
| 392,931 | 11/1888 | Prindle | 277—170 X |
| 448,765 | 3/1891 | Kaiser | 285—363 X |
| 813,454 | 2/1906 | Schaad | 285—363 X |
| 2,166,232 | 7/1939 | Brownell | 285—331 |
| 2,599,767 | 6/1952 | Long. | |
| 3,007,600 | 11/1961 | Horner | 277—236 X |

CARL W. TOMLIN, Primary Examiner

D. W. AROLA, Assistant Examiner

U.S. Cl. X.R.

177—171, 236; 285—368, 416